(12) United States Patent
Kim et al.

(10) Patent No.: US 9,907,019 B2
(45) Date of Patent: Feb. 27, 2018

(54) ACCESS POINT (AP) FOR ALLOCATING ASSOCIATION IDENTIFICATION (AID) BASED ON TYPE OF STATIONS (STAS) AND OPERATION METHOD OF AP

(71) Applicant: Electronics and Telecommunications Research Institute, Daejeon (KR)

(72) Inventors: Hong Soog Kim, Daejeon (KR); Je Hun Lee, Daejeon (KR); Sok Kyu Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 274 days.

(21) Appl. No.: 14/165,188

(22) Filed: Jan. 27, 2014

(65) Prior Publication Data
US 2014/0219149 A1    Aug. 7, 2014

(30) Foreign Application Priority Data
Feb. 1, 2013    (KR) .................. 10-2013-0011827

(51) Int. Cl.
*H04W 52/02*    (2009.01)

(52) U.S. Cl.
CPC ......... *H04W 52/0216* (2013.01); *Y02B 60/50* (2013.01)

(58) Field of Classification Search
None
See application file for complete search history.

(56) References Cited

U.S. PATENT DOCUMENTS

| | | | |
|---|---|---|---|
| 2003/0227893 A1* | 12/2003 | Bajic | 370/338 |
| 2009/0103487 A1* | 4/2009 | Oh et al. | 370/329 |
| 2012/0127920 A1* | 5/2012 | Kobayashi | 370/315 |
| 2013/0155930 A1* | 6/2013 | Chu et al. | 370/311 |

* cited by examiner

*Primary Examiner* — Hassan Kizou
*Assistant Examiner* — Ashil Farahmand
(74) *Attorney, Agent, or Firm* — NSIP Law

(57) ABSTRACT

Provided is an access point (AP) for providing wireless communication to a plurality of stations (STAs), the AP including a type determiner to determine a type of each of the plurality of STAs, and an association identification (AID) allocator to allocate AIDs to the plurality of STAs, respectively, based on the determined type such that AIDs corresponding to an identical type among the allocated AIDs are clustered.

12 Claims, 15 Drawing Sheets

| Name | Value |
|---|---|
| ARPS_Start | - |
| ARPS_End | - |
| Num_Reusable_AIDS_ARPS | - |
| AROP_Start | - |
| AROP_End | - |
| Num_Reusable_AIDS_AROP | - |
| ... | ... |

AMT: AAM Management Table

AAM: AID Allocation Bitmap

FIG. 4

| Octet # | Bit # 0 | 1 | 2 | 3 | 4 | 5 | 6 | 7 |
|---|---|---|---|---|---|---|---|---|
| 0 | 0 | 1 | 2 | 3 | 4 | 5 | 6 | 7 |
| 1 | 8 | 9 | a | b | c | d | e | f |
| 2 | 10 | 11 | 12 | 13 | 14 | 15 | 16 | 17 |

•••

| k |   |   |   |   |   |   |   |   |
|---|---|---|---|---|---|---|---|---|
| k+1 |   |   |   |   |   |   |   |   |
| k+2 |   |   |   |   |   |   |   |   |

•••

| 248 | 7c0 | 7c1 | 7c2 | 7c3 | 7c4 | 7c5 | 7c6 | 7c7 |
|---|---|---|---|---|---|---|---|---|
| 249 | 7c8 | 7c9 | 7ca | 7cb | 7cc | 7cd | 7ce | 7cf |
| 250 | 7d0 | 7d1 | 7d2 | 7d3 | 7d4 | 7d5 | 7d6 | 7d7 |

| Name | Value |
|---|---|
| ARPS_Start | - |
| ARPS_End | - |
| Num_Reusable_AIDS_ARPS | - |
| AROP_Start | - |
| AROP_End | - |
| Num_Reusable_AIDS_AROP | - |
| ... | ... |

AMT: AAM Management Table

AAM: AID Allocation Bitmap

FIG. 9

| Name | Value Type |
|---|---|
| ARPS_Start<br>(Start AID of Allocated Region for PSM STAs) | Unsigned int |
| ARPS_End<br>(End AID of Allocated Region for PSM STAs) | Unsigned int |
| Num_Reusable_AIDs_ARPS<br>(Number of resuable AID within allocated region for other cases) | Unsigned int |
| AROP_Start<br>(Start AID of allocated region for other purposes) | Unsigned int |
| AROP_End<br>(End AID of allocated region for other purposes) | Unsigned int |
| Num_Resuable_AIDs_AROP<br>(Number of resuable AID within allocated region for other purposes) | Unsigned int |
| ... | ... |

ACCESS POINT (AP) FOR ALLOCATING ASSOCIATION IDENTIFICATION (AID) BASED ON TYPE OF STATIONS (STAS) AND OPERATION METHOD OF AP

CROSS-REFERENCE TO RELATED APPLICATION

This application claims the priority benefit of Korean Patent Application No. 10-2013-0011827, filed on Feb. 1, 2013, in the Korean Intellectual Property Office, the disclosure of which is incorporated herein by reference.

BACKGROUND

1. Field of the Invention

The present invention relates to an operation method of an access point (AP) providing a wireless communication to a plurality of stations (STAs) supporting a power save (PS) mode, and more particularly to a method of allocating an association identification (AID) for distinguishing STAs in a predetermined service set (SS) managed by the AP and managing the allocated AID.

2. Description of the Related Art

In a wireless local region network (WLAN) system, a service set (SS) includes an access point (AP) and stations (STAs) communicating by using the AP. In order to determine SSs, a service set identification (SSID) may be allocated for each of the SSs. Also, in order to determine STAs participating in a predetermined SS managed by the AP, the AP may allocate an association identification (AID) for each of the STAs.

In contrast to a wired network, since power in a wireless device is generally dependent on a battery in a wireless network, efficient power management is a significant concern. An Institute of Electrical and Electronics Engineers (IEEE) 802.11 standard provides a power saving mechanism for efficient power management of a WLAN device.

SUMMARY

According to an aspect of the present invention, there is provided an access point (AP) for providing wireless communication to a plurality of stations (STAs), the AP including a type determiner to determine a type of each of the plurality of STAs, and an association identification (AID) allocator to allocate AIDs to the plurality of STAs, respectively, based on the determined type such that AIDs corresponding to an identical type among the allocated AIDs are clustered.

The type determiner may determine the type of each of the plurality of STAs based on whether each of the plurality of STAs operates based on a power saving mechanism (PSM).

The AID allocator may include an allocation region dividing unit to divide an allocation region for allocating the AIDs to the plurality of STAs into a plurality of sub-allocation regions, and a sub-allocation region selecting unit to select a sub-allocation region corresponding to the determined type from among the plurality of sub-allocation regions to allocate the AIDs to the plurality of STAs based on the determined type.

The AID allocator may include an allocation region dividing unit to divide an allocation region for allocating the AIDs to the plurality of STAs into a plurality of sub-allocation regions, based on an AID allocation bitmap (AAM) and an AAM management table (AMT), wherein bits included in the AAM may correspond to the plurality of STAs, and each value of the bits may indicate whether an AID is allocated to a corresponding STA.

The AP may further include a beacon signal generator to generate a beacon signal transmitted to each of the plurality of STAs based on the AAM.

The AMT may include at least one of information associated with start points of the plurality of sub-allocation regions, information associated with end points of the plurality of sub-allocation regions, and information associated with reusable regions included in the plurality of sub-allocation regions.

The AP may further include a request receiver to receive, from each of the plurality of STAs, one of a plurality of predetermined requests including an association request, a reassociation request, and a dissociation request, and a request determiner to determine a type of the received request.

When the request determiner determines the received request to be one of the association request and the reassociation request, the AID allocator may allocate the AIDs to the plurality of STAs by using a reusable region of a cluster corresponding to the determined type.

The AP may further include an AID dissociating unit to dissociate the AIDs from the plurality of STAs when the request determiner determines the received request to be the dissociation request, wherein the AID dissociating unit may determine, based on a result of the dissociating, whether reducing a size of the cluster corresponding to the determined type is possible, and reduce, based on a result of the determining, the size of the cluster corresponding to the determined type.

According to another aspect of the present invention, there is also provided an operation method of an AP providing wireless communication to a plurality of STAs supporting a PSM, the method including receiving an association request signal from each of the plurality of STAs, allocating AIDs to the plurality of STAs such that a size of a beacon frame periodically transmitted to the STA is reduced, and transmitting an association response frame including the allocated AIDs to the plurality of STA.

The operation method of an AP may further include determining, based on the association request signal, whether each of the plurality of STAs is in a PS mode, wherein the determining may include allocating the AIDs to the plurality of STAs based on a result of the determining.

The allocating may include dividing a predetermined AID allocation region into a region for an STA in the PS mode and respective regions for other STAs.

The allocating may include allocating the AIDs to the plurality of STAs based on a management table managing the predetermined AID allocation region.

The operation method of an AP may further include receiving a dissociation request signal from each of the plurality of STAs, and dissociating the AIDs from the plurality of STAs such that the size of the beacon frame is reduced.

According to still another aspect of the present invention, there is also provided an operation method of an AP providing wireless communication to a plurality of STAs included in an identical service set (SS), the method including allocating AIDs such that a size of a traffic indication map (TIM) information element (IE) is minimized.

The allocating may include recognizing PSM STAs among the plurality of STAs, and allocating AIDs corresponding to the PSM STAs to be adjacent on a traffic indication virtual bitmap (TIVM) such that a size of a partial virtual map (PVM) included in the TIM IE is minimized.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 4 is a diagram illustrating a configuration of a traffic indication virtual bitmap (TIVM) maintained and managed by an AP according to an example embodiment;

FIG. 9 is a diagram illustrating a field included in an AMT and a type of a value of the field according to an example embodiment;

DETAILED DESCRIPTION

Figure 1:
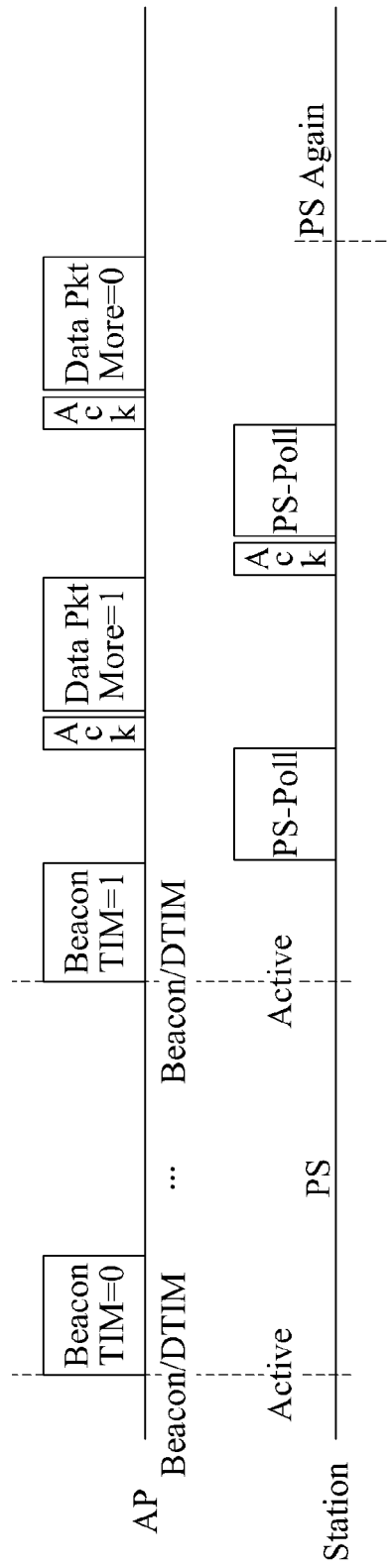
FIG. 1 is a diagram illustrating an operation procedure of a station (STA) using a power saving mechanism (PSM) according to an example embodiment.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a diagram illustrating an operation procedure of a station (STA) using a power saving mechanism (PSM) according to an example embodiment. The STA using the PSM may convert a power state into a power save (PS) mode to reduce power consumption. In this case, an access point (AP) may buffer, in an internal buffer, a data frame to transmit to a corresponding STA.

The STA may request an association with the AP, and execute a transmitter/receiver by converting the power state into an active mode for each authenticated listen interval.

The STA executing the transmitter/receiver by converting the power state into the active mode for each authenticated listen interval may receive a beacon frame transmitted for each beacon interval by the AP, and analyze information on a partial virtual map (PVM) field encoded in a traffic indication map (TIM) information element (IE) of the beacon frame.

When the data frame transmitted to the STA is present, the STA may request transmission of the buffered data frame using a PS-poll control frame. The AP may transmit the buffered data frame to a corresponding STA. When the buffered data frame does not remain, the STA may convert the power state into the PS mode and terminate the transmitter/receiver, thereby reducing power consumption.

The AP may manage a traffic indication virtual bitmap (TIVM). Here, the TIVM may refer to a bitmap with respect to a range of all association identifications (AIDs) managed by the AP. When the STA related to a predetermined AID operates in the PS mode, the AP may buffer, to the AP, the buffered data frame transmitted to the corresponding STA, and set a bit corresponding to the AID associated with the corresponding STA to be "1" as an indication of the buffering.

An Institute of Electrical and Electronics Engineers (IEEE) 802.11 standard provides the PSM for efficient power management of wireless local region network (WLAN) devices. In contrast to a wired network, since a power of a wireless device is generally dependent on a battery in a wireless network, efficient power management is a significant concern.

Hereinafter, although the detailed description of the present invention is intended to describe a case in which a multiple basic service set identification (BSSID) is not supported and an AP operation in lieu of a mesh STA operation for increased ease and convenience of description, it is to be understood that the disclosure of the present invention can be applied to a mesh STA and an AP supporting the multiple BSSID.

Figure 2:
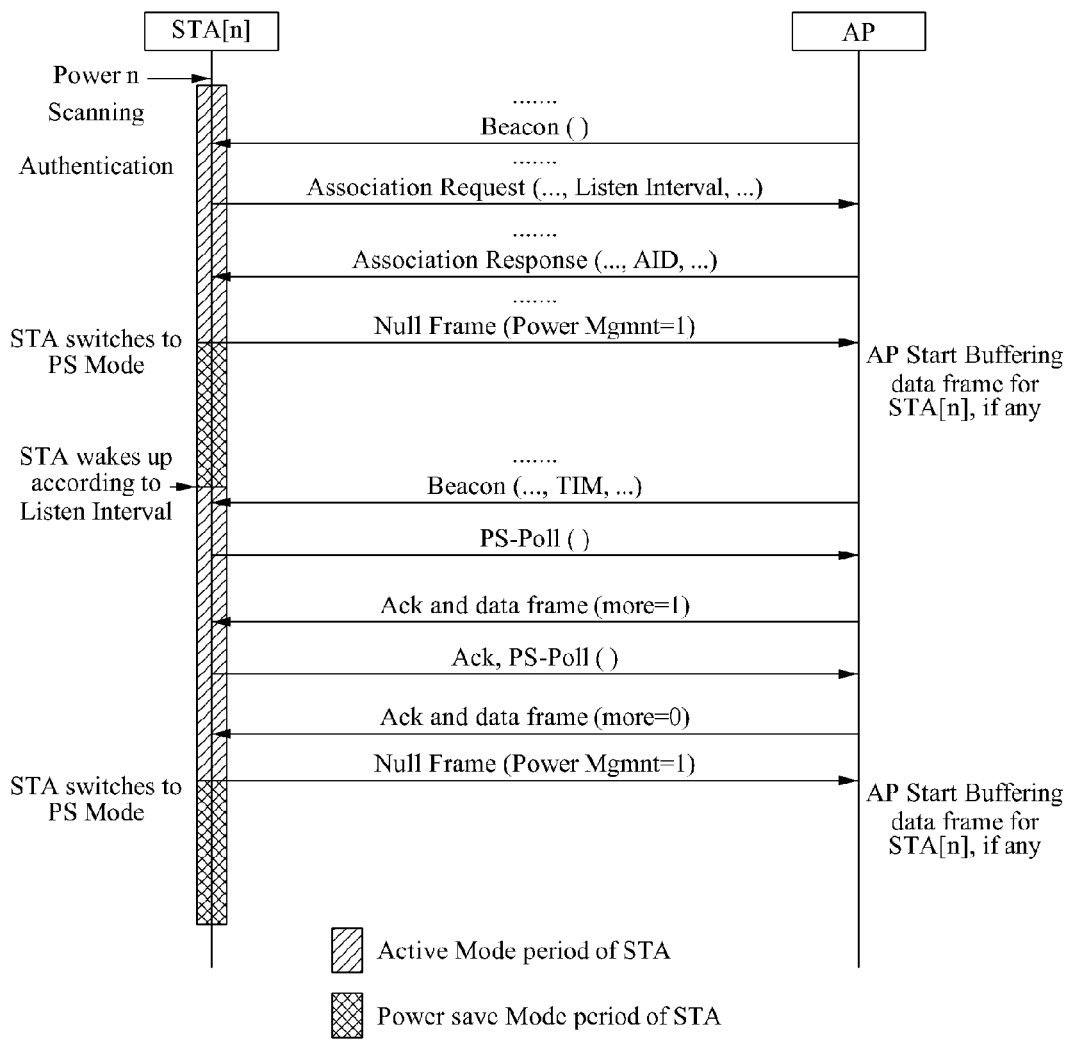
FIG. 2 is a diagram illustrating an example of exchanging a frame between an access point (AP) and a power save STA.

Referring to FIG. 2, an STA operating based on a PSM and an AP may exchange frames necessary for a PSM operation each other. Hereinafter, the STA operating based on a PSM may be also referred to as a PSM STA.

After a power-on of the PSM STA, the PSM STA may determine an AP for an association through a process of scanning. When an authentication is performed on a corresponding AP, the PSM STA may transmit an association request frame to request an association.

A listen interval included in the association request frame may designate a period in which a corresponding PSM STA wakes up, executes a receiver, and receives a beacon frame while operating in a PS mode in the PSM operation.

The PSM STA may execute the receiver for each listen interval designated in the association request frame and receive the beacon frame. Subsequently, the PSM STA may analyze PVM information included in a TIM IE of the beacon frame, and verify whether a frame to be transmitted to the PSM STA is buffered to the AP.

When a presence of the data frame buffered to the AP is verified, the PSM STA may transmit a PS-poll control frame and receive the buffered frame. When a subsequent operation of transmitting the PS-poll control frame is terminated, the PSM STA may enter the PS mode again.

Figure 3:
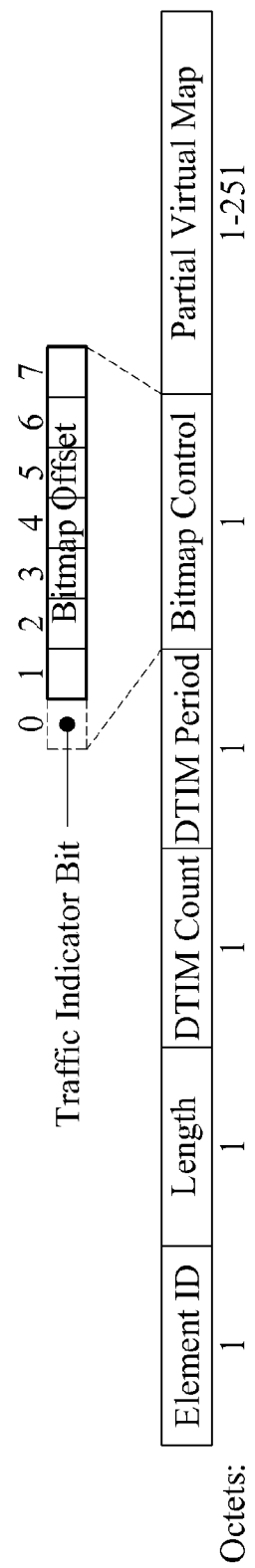
FIG. 3 is a diagram illustrating a configuration of a traffic indication map (TIM) information element (IE) used as an IE of a TIM frame or a beacon frame according to an example embodiment.

FIG. 3 is a diagram illustrating a configuration of a TIM IE used as an IE of a TIM frame or a beacon frame according to an example embodiment.

Referring to FIG. 3, fields for use in the TIM IE may be used as described below.

A length field may indicate a total length of a delivery TIM (DTIM) count, a DTIM period, a bitmap control, and a PVM field. Thus, a value of the length field may be obtained by "3+PVM field size".

A DTIM count field may indicate a number of beacon frames provided until a subsequent DTIM ends including a current beacon frame. When a value of the DTIM count field corresponds to "0", a TIM included in a corresponding beacon frame may become a DTIM.

A DTIM period field may indicate a number of beacon intervals existing among successive DTIMs. When a value of the DTIM period field corresponds to "1", all TIMs may become DTIMs.

A bitmap control field may include a zeroth bit used as a traffic indicator bit and a bitmap offset subfield including a first bit through a seventh bit, aside from the zeroth bit. The zeroth bit may be also referred to as the traffic indicator bit and correspond to a traffic indication bit related to an AID. When the TIM is the DTIM or the value of the DTIM count field corresponds to "0", and when the traffic indicator is set to be "1", group addressed media access control (MAC) service data units (MSDUs)/MAC management protocol data units (MMPDUs) may be buffered to the AP or a mesh STA. The bitmap offset subfield may address a start point of the PVM in a traffic indication virtual bitmap (TIVM) including up to 251 octets. Here, a value of the bitmap offset field may correspond to an offset for the start point of the PVM based on two octets as a unit.

The PVM field may refer to a variable length field having a size between one octet and 251 octets. The PVM may be a subset of the TIVM described below, and include a region set as "1" of the TIVM. A start point of the PVM may be a start point of a two-octet unit in the TIVM including a bit having a minimal bit number among bits set as "1", and an end point of the PVM may be a bit having a maximum bit number among the bits set as "1".

FIG. 4 is a diagram illustrating a configuration of a TIVM maintained and managed by an AP according to an example embodiment.

Referring to FIG. 4, the TIVM according to an example embodiment may include 251 octets based on the IEEE 802.11 standards. Thus, the TIVM may be a bitmap having a size of 2008 bits.

Each bit may indicate whether traffic is buffered to an STA having a corresponding AID. For example, when a predetermined bit is set to be "1", the traffic may be buffered to the STA using an AID corresponding to the bit.

Figure 5:
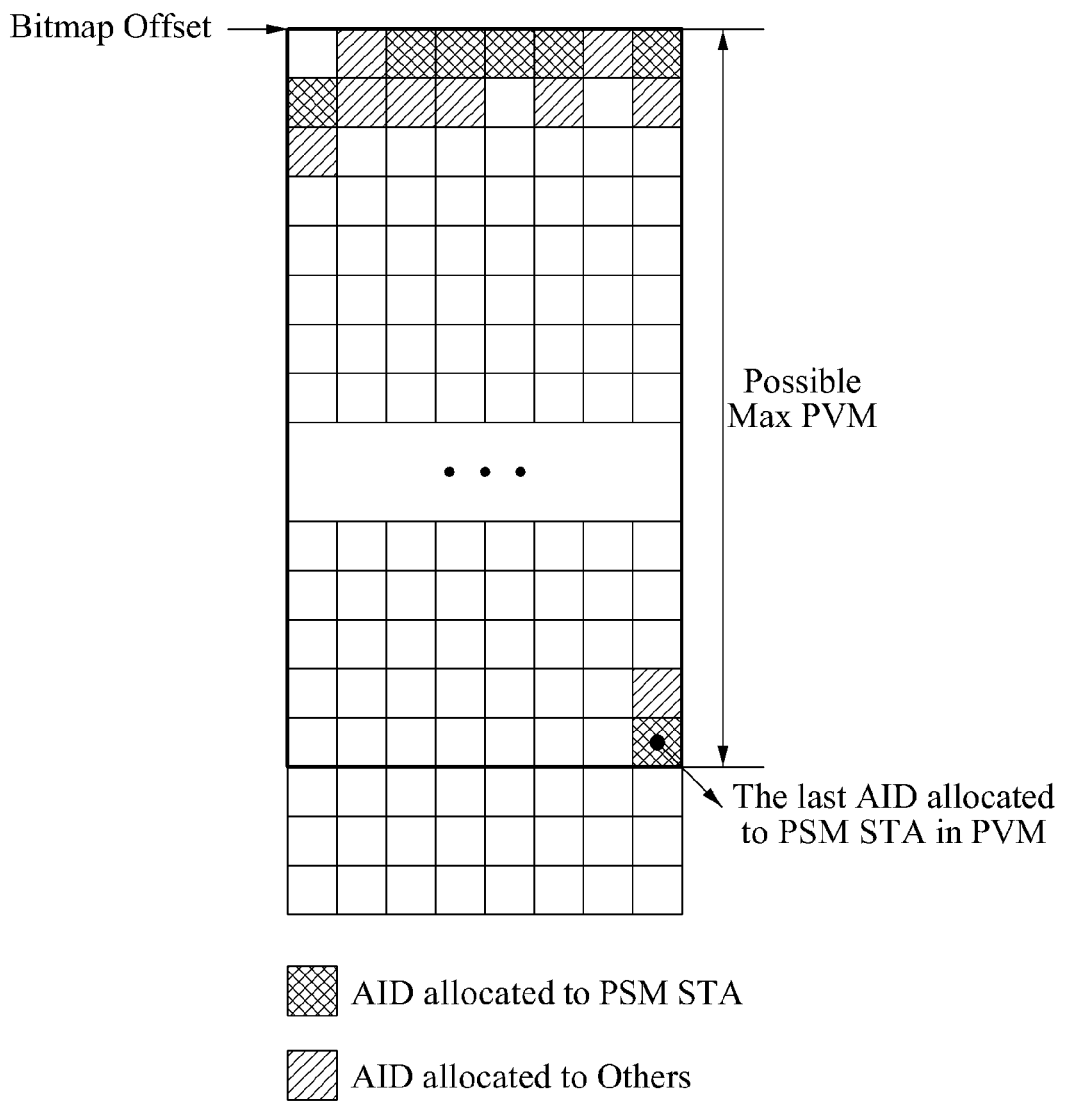
FIG. 5 is a diagram illustrating a TIVM and a partial virtual map (PVM) according to an example embodiment.

FIG. 5 is a diagram illustrating a TIVM and a PVM according to an example embodiment.

Referring to FIG. 5, a bit indicated by a hatched portion with diagonal lines and a bit indicated by a hatched portion with intersecting diagonal lines may indicate AIDs allocated to STAs, and bits indicated by non-hatched portions may indicate unallocated AIDs. An AID corresponding to the bit indicated by a hatched portion with diagonal lines may indicate that an STA using the corresponding AID operates based on a PSM, that is, the AID allocated to a PSM STA. An AID corresponding to the bit indicated by a hatched portion with intersecting diagonal lines may indicate the AID allocated to other STAs.

In FIG. 5, a bitmap offset subfield of a TIM IE of FIG. 3 is indicated. When the AID is allocated, a possible maximum size of a PVM field may be indicated by a bold rectangle. A sub-bitmap having buffered traffic among TIVMs may be referred to as a PVM. In FIG. 5, the possible maximum size of the PVM may be a region indicated by the bold rectangle due to an allocation of the AID indicated as "the last AID allocated to PSM STA in PVM".

Figure 6:
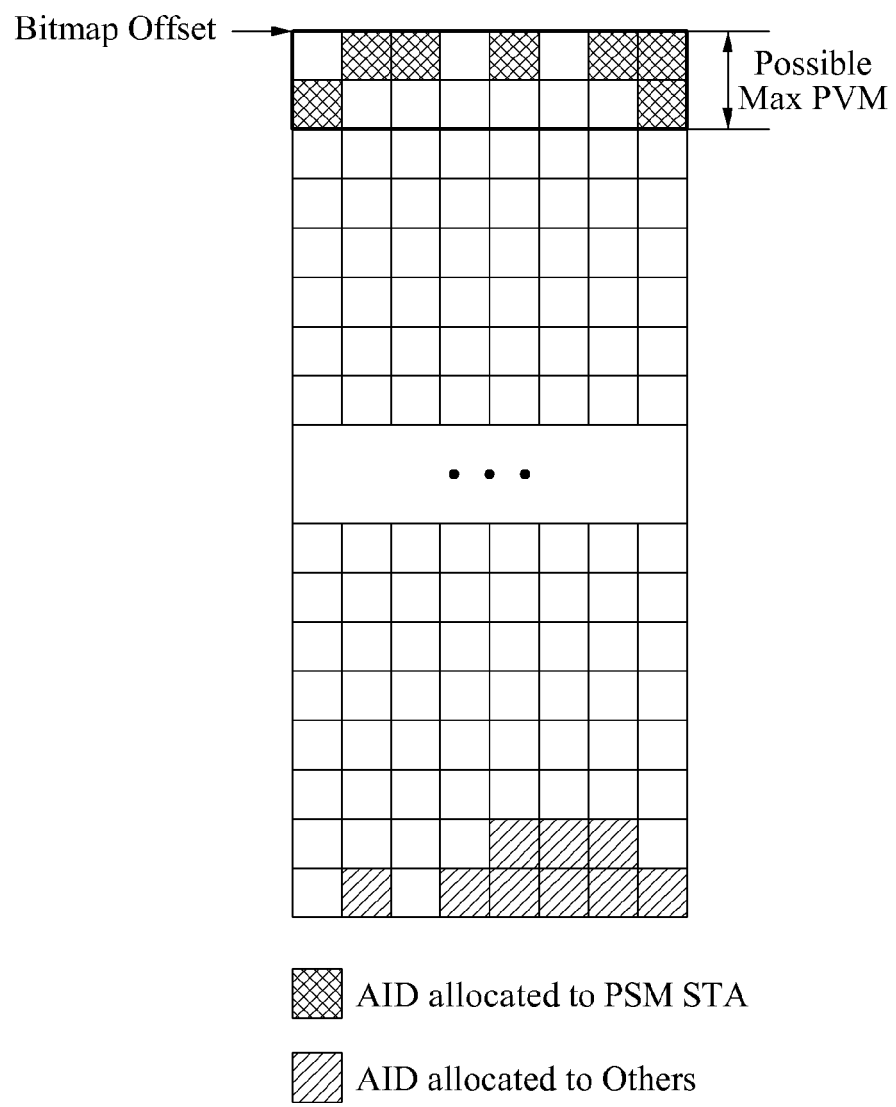
FIG. 6 is a diagram illustrating an operation method of minimizing a size of a PVM by allocating an association identification (AID) based on a PSM STA.

FIG. 6 is a diagram illustrating an operation method of minimizing a size of a PVM by allocating an AID based on a PSM STA.

In terms of allocating the AID in a management environment identical to that of FIG. 5, when the AID is allocated and managed to be clustered in a TIVM without separation, based on the PSM STA, a possible maximum size of the PVM may be reduced as shown in FIG. 6.

As described in FIGS. 5 and 6, the size of the PVM may vary based on a scheme of allocating and managing the AID. For example, when the AID is improperly managed, the size of the PVM may be unnecessarily increased, or become equal to a size of the TIVM. Thus, a scheme of managing the AID to minimize the size of the PVM may be necessary.

The PVM may be included in a TIM IE of a TIM frame or a beacon frame transmitted by an AP as a subfield. Thus, when the size of the PVM is minimized, a size of the beacon frame may be reduced, and an amount of time for analyzing the PVM of the beacon frame received by STAs may be reduced.

Figure 7:
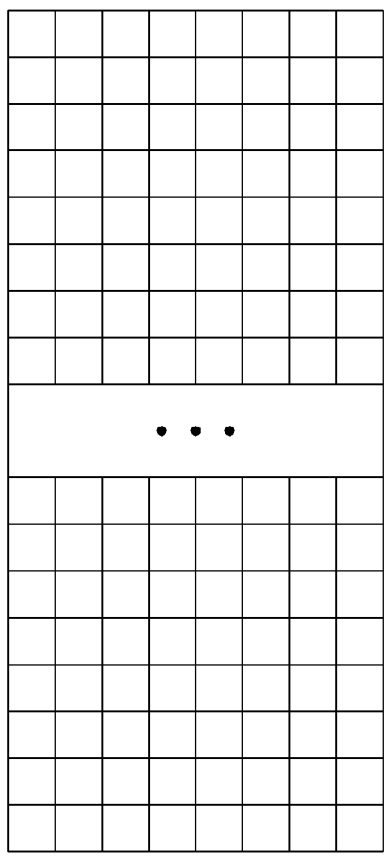
FIG. 7 is a diagram illustrating an AID allocation bitmap (AAM) and an AAM management table (AMT) according to an example embodiment.

FIG. 7 is a diagram illustrating an AID allocation bitmap (AAM) and an AAM management table (AMT) according to an example embodiment. Referring to FIG. 7, to allocate and manage an AID for minimizing the PVM, an AP according to an example embodiment may maintain and manage the AAM which is a bitmap managing whether the AID is allocated, fields for managing an AID allocated to a PSM STA in the AAM, and the AMT including fields for managing AIDs allocated to others, aside from the AID allocated to the PSM STA, and fields including other information.

When compared to the TIVM, the AAM may be included in an identical configuration and have a difference in setting a corresponding bit. When a value of the bit is "1" in the TIVM, traffic buffered to an STA using the AID corresponding to the bit may be present. When the value of the bit is "0" in the TIVM, the traffic buffered to the STA using the AID corresponding to the bit may be absent. Conversely, when a value of the bit is "1" in the AAM, the AID corresponding to the bit may be allocated. When the value of the bit is "0" in the AAM, the AID corresponding to the bit may be unallocated.

Hereinafter, although drawings and descriptions with reference to the accompanying drawings will be provided by designating a direction for an AID allocation, a start point of each AID region, and an end point of each AID region for increased ease and convenience of description, the present inventive concept may be generally applied, and should not be construed as limited to the embodiments set forth herein. In addition, structural elements and a method of operating the structural elements of the present invention may be implemented by a computer program, a hardware device, and the like alone or in combination thereof. Although the following description will be provided in a form of the computer program to assist understanding, it is to be understood that such a description is not intended to limit a method of implementing the present invention.

Figure 8:
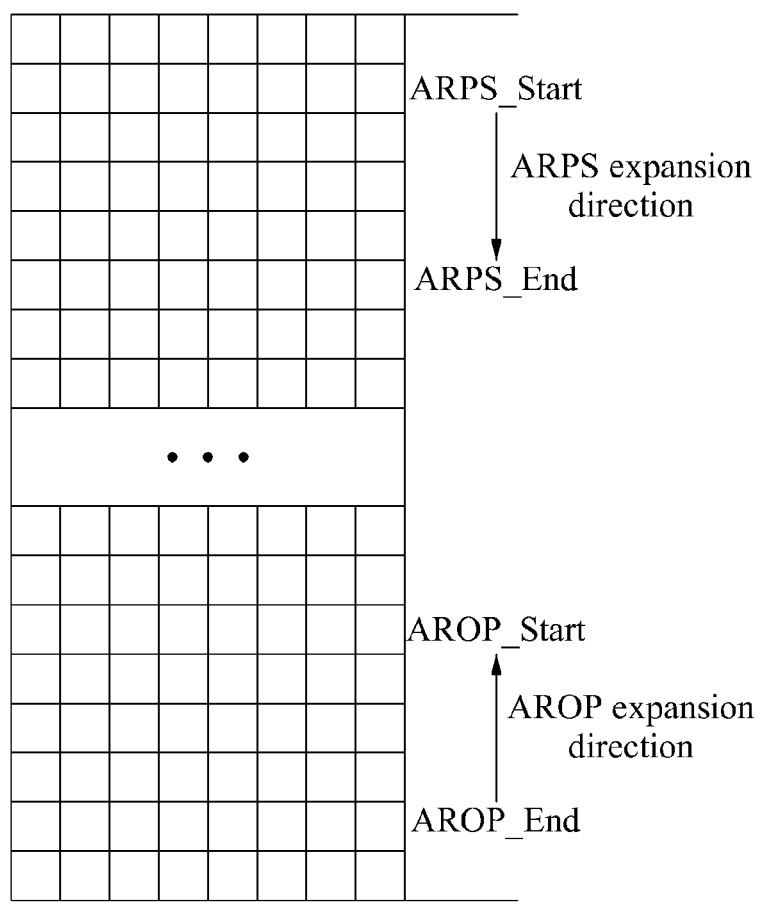
FIG. 8 is a diagram illustrating a method of managing an AAM to minimize a size of a PVM according to an example embodiment.

FIG. 8 is a diagram illustrating a method of managing an AAM to minimize a size of a PVM according to an example embodiment. Referring to FIG. 8, an AID may be allocated in an AAM. An allocation region for a PSM STA (ARPS) may be allocated in an expansion direction, starting from a start point of the AAM such that an AID allocated to a PSM STA may be maintained in a form of a cluster. In cases other than the PSM STA, an allocation region for other purposes (AROP) may be allocated in a reducing direction of the AID, starting from an end point of the AAM.

FIG. 9 is a diagram illustrating a field included in an AMT and a type of a value of the field according to an example embodiment. Referring to FIG. 9, the AMT may be used to manage an AID allocation region for a PSM STA and an AID allocation region for other purposes. Fields and values of the fields included in the AMT are described hereinafter with reference to FIG. 9.

Fields included in the AMT of FIG. 9 may be divided into fields for managing an ARPS in which AIDs allocated to the PSM STA are clustered, fields for managing an AROP in which AIDs allocated for the other purposes are clustered, and fields for other forms of management.

The fields for managing the ARPS may be indicated as follows. An ARPS_Start field may maintain a minimum AID value among AID values included in the ARPS. An ARPS_End field may maintain a maximum AID value among the AID values included in the ARPS. For example, in a case in which an AID between an AID value stored in the ARPS_Start field and an AID value stored in the ARPS_End field is unallocated, or a case in which the PSM STA receiving an allocation of the AID returns the allocated AID through an operation of dissociation, and the like, a Num_Reusable_AIDs_ARPS field may maintain a to total number of reusable AIDs.

The fields for managing the AROP may be indicated as follows. An AROP_Start field may maintain a minimum AID value among AID values included in the AROP. An AROP_End field may maintain a maximum AID value among the AID values included in the AROP. For example, in a case in which an AID between an AID value stored in the AROP_Start field and an AID value of stored in the AROP_End field is unallocated, or a case in which the PSM STA receiving an allocation of the AID returns the allocated AID through an operation of dissociation, and the like, a Num_Reusable_AIDs_AROP field may maintain a total number of reusable AIDs.

Figure 10:
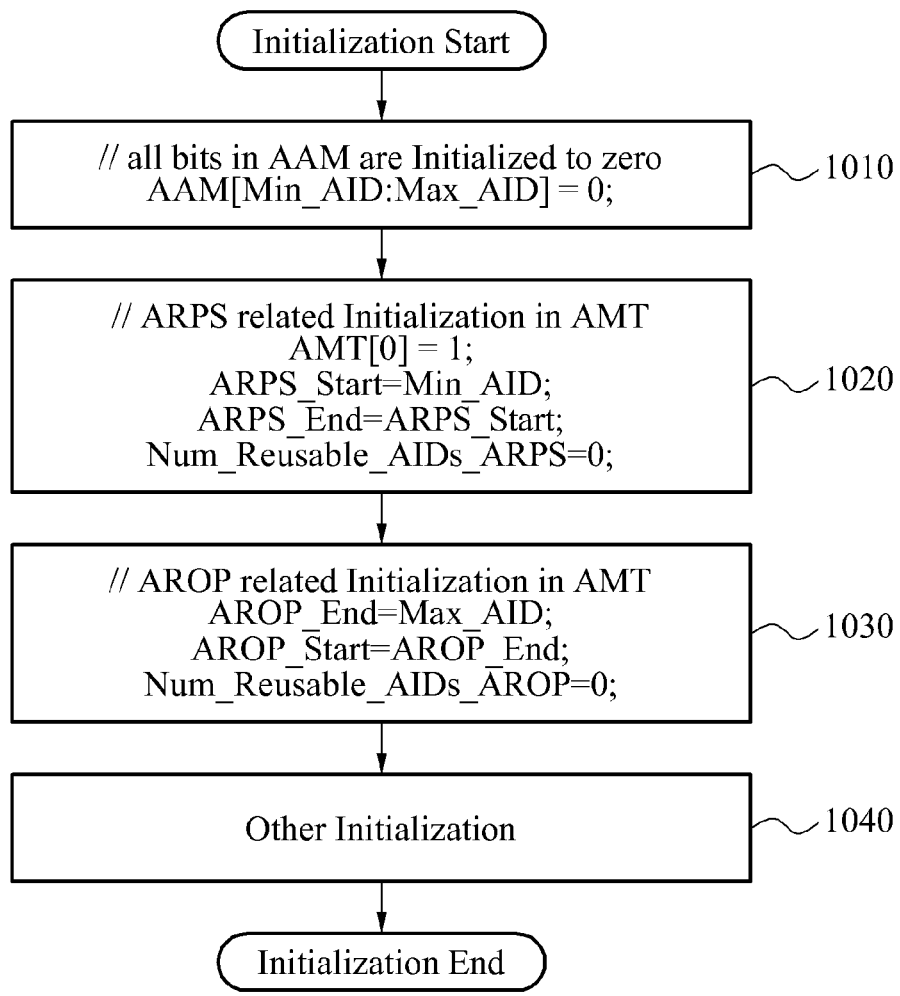
FIG. 10 is a flowchart illustrating a method of initializing an AAM and an AMT according to an example embodiment.

FIG. 10 is a flowchart illustrating a method of initializing an AAM and an AMT according to an example embodiment. Referring to FIG. 10, each field of the AMT and the AMM may be initialized.

A procedure of initializing a data structure may be indicated as follows. In operation 1010, the AAM may be initialized. For example, all bits of the AAM may be initialized to be "0".

In operation 1020, an ARPS-related initialization may be performed in the AMT. An ARPS_Start field may be initialized to be a minimum AID value, for example, Min_AID among AIDs available for an allocation. In general, ARPS_Start=0. However, when an AP supports multiple BSSIDs, ARPS_Start may be initialized to be 2i+1 rather than "0" because a start point of a TIVM corresponding to a maximum number of multiple BSSIDs, for example, a number of 2i forms supported in the TIVM may be used. An ARPS_End field may be initialized to have the same value as the ARPS_Start field. A Num_Reusable_AIDs_ARPS field may be initialized to be "0".

In operation 1030, an AROP-related initialization may be performed in the AMT. A maximum AID value, for example, Max_AID among AIDs available for an allocation may be allocated to an AROP_End. Based on the IEEE 802.11 standard, the TIVM may include 251 octets. The TIVM may be a 2008 bit bitmap. Thus, the maximum AID value among AIDs available for an allocation may be "2007". In general, the AROP_End may be initialized to be "2007". The ARPS_Start field may be initialized to have the same value as the AROP_End field. A Num_Reusable_AIDs_ AROP field may be initialized to be "0".

In operation 1040, an initialization may be performed for other purposes.

Subsequent to the initialization, when an association/reassociation request frame is received, or when a dissociation request is transmitted or received, an AP may additionally perform an operation related to the AAM and AMT.

Figure 11:
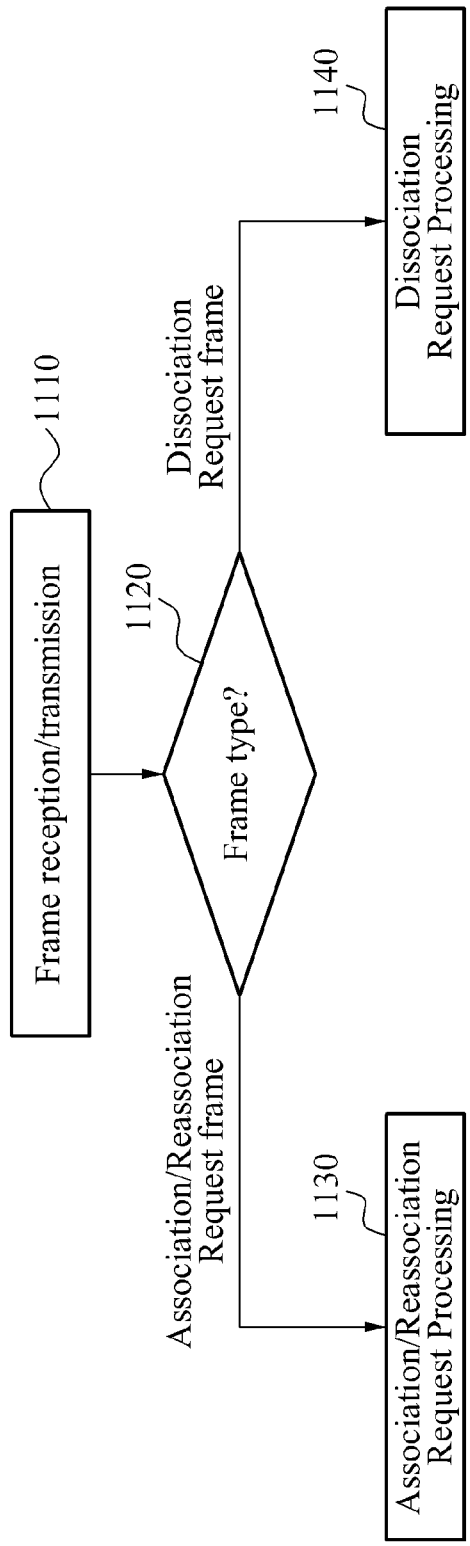
FIG. 11 is a flowchart illustrating an operation procedure performed in an AP in a case of an occurrence of a frame transmission and reception event according to an example embodiment.

FIG. 11 is a flowchart illustrating an operation procedure in an AP in a case of an occurrence of a frame transmission and reception event according to an example embodiment.

Referring to FIG. 11, when the frame transmission and reception event occurs in operation 1110, the AP according to an example embodiment may determine a type of a frame in operation 1120. In operation 1130, when the type of the received frame is an association request frame or a reassociation request frame, an association/reassociation request processing may be called. In operation 1140, when the transmitted or received frame is a dissociation request frame, a dissociation request processing may be called.

In another example embodiment, a dissociation request may be transmitted by the AP as well as an STA. In this example, management of the AAM and the AMT may be required for the dissociation request frame transmitted by the AP.

The association/reassociation request processing and the dissociation request processing may be performed to manage and allocate in a direction of minimizing the size of the PVM using the AAM and the AMT.

Hereinafter, descriptions directly related to the AAM and the AMT will be provided in an association/reassociation request processing and a dissociation request processing for increased ease and convenience of description. Other information may be complied with an processing procedure defined in the IEEE 802.11 standards.

Figure 12:
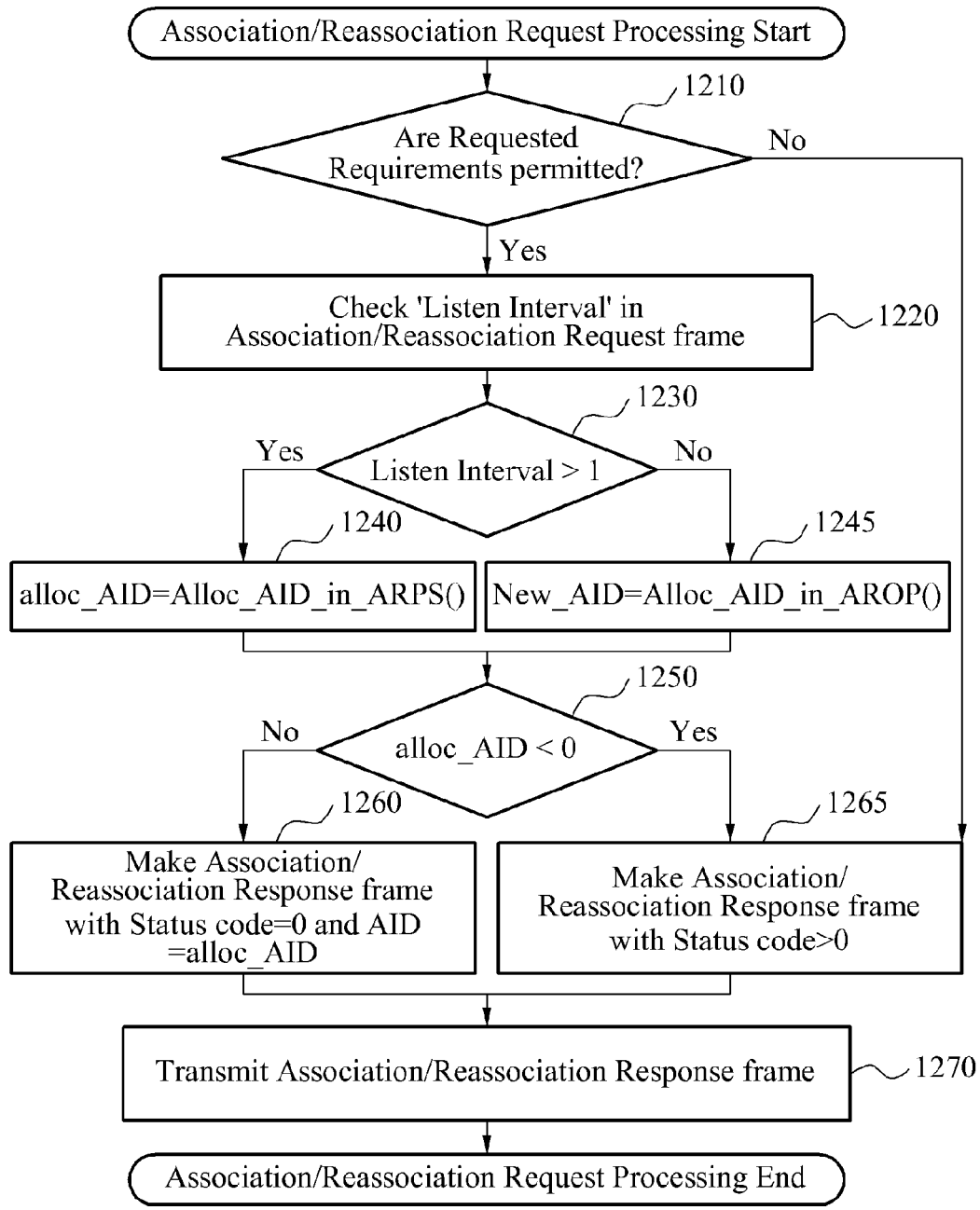
FIG. 12 is a flowchart illustrating an association/reassociation request processing according to an example embodiment.

FIG. 12 is a flowchart illustrating an association/reassociation request processing according to an example embodiment.

Referring to FIG. 12, an AP according to an example embodiment may verify information included in an association/reassociation request frame. When requested information is unacceptable, the AP may generate an association/reassociation response frame in which a value corresponding to a status code of the IEEE 802.11 standard and transmit the generated association/reassociation response frame. In this case, the AP may not perform operations related to an AAM and an AMT.

In operation 1210, the AP may verify information included in the association/reassociation request frame, and determine whether requested requirements are permitted. When the requested requirements are permitted, the AP may perform an operation as described below.

In operation 1220, the AP may verify a value of a listen interval of a frame. In operation 1230, the AP may compare the value of the listen interval of the frame with "1". In operation 1240, when a result of the verifying is greater than "1", the AP may determine the presence of a PSM STA. Also, the AP may call Alloc_AID_In_ARPS( ), and receive an allocation of an AID. In operation 1245, when the value of the listen interval is less than "1", the AP may call Alloc_AID_In_AROP( ) and receive the allocation of the AID.

When the allocation of the AID fails, Alloc_AID_In_ARPS( ) and Alloc_AID_In_AROP( ) may return a value less than "0". In operation 1250, the AP may determine whether alloc_AID is less than "0". When the allocation of the AID is successful, Alloc_AID_In_ARPS( ) and Alloc_AID_In_AROP( ) may return a value of an allocated AID. The returned value may be stored in alloc_AID.

In operation 1265, when alloc_AID is less than "0", the AP may set a status code field to be a value corresponding to a status code of the IEEE 802.11 standard because Min_AID through MAX_AID are fully allocated and an AID to be allocated is absent. In operation 1270, the AP may generate the association/reassociation response frame in which the status code field is set to be the value corresponding to the status code of the IEEE 802.11 standard, and transmit the generated association/reassociation response frame.

When alloc_AID is determined to be greater than or equal to "0", in operation 1265, the AP may set the status code field value to be "0" indicating a successful outcome, and the AID field value may be set to be alloc_AID in operation 1260. In operation 1270, the AP may generate an association/reassociation response frame in which the status code field value is set to be "0" indicating a successful outcome, and the AID field value is set to be alloc_AID, and transmit the generated association/reassociation response frame.

Figure 13:
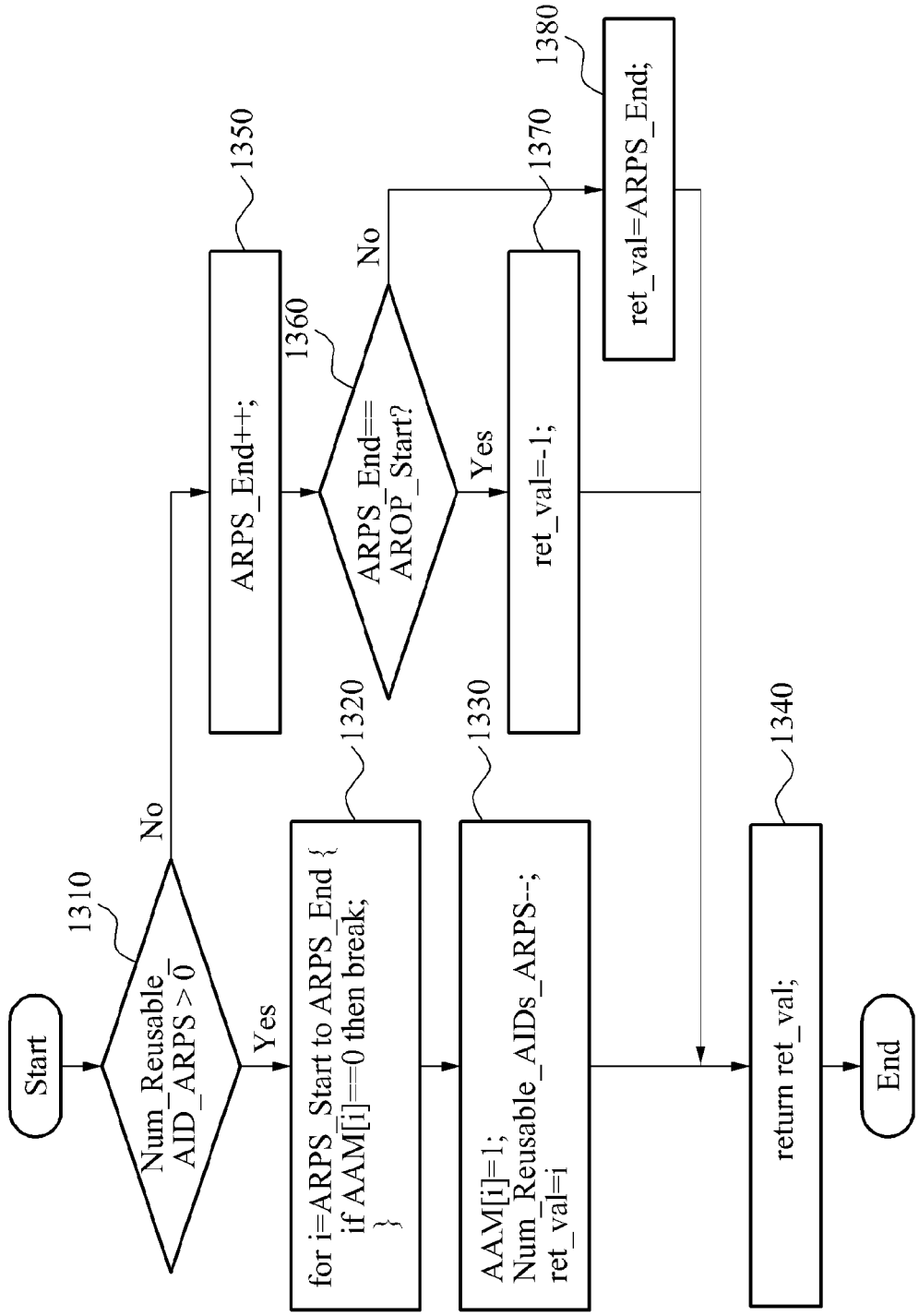
FIG. 13 is a flowchart illustrating a function of Alloc_AID_In_ARPS( ) called to allocate an AID in an allocation region for PSM STAs according to an example embodiment.

FIG. 13 is a flowchart illustrating a function of Alloc_AID_In_ARPS( ) called for allocating an AID in an ARPS according to an example embodiment.

Referring to FIG. 13, in operation 1310, an AP according to an example embodiment may verify a number of reusable AIDs of the ARPS based on a Num_Reusable_AIDs_ARPS field value of an AMT.

When the reusable AID is present, in operation 1320, the AP may search in a direction from ARPS_Start to ARPS_End for i corresponding to AAM[i]==0. The retrieved i may be set to be a return value, for example, ret_val. In operation 1330, since AID i is reused and allocated, an allocation of AID i may be indicated by setting AAM[i]=1, and the Num_Reusable_AIDs_ARPS field value may be reduced by "1" from a current value.

In an example of realizing Alloc_AID_In_ARPS( ), when the reusable AID is retrieved, the searching is performed in the direction from ARPS_Start to ARPS_End to discover the reusable AID. Accordingly, the reusable AID close to ARPS_Start may be preferentially reused, and ARPS_End may be reduced when conditions are satisfied in the dissociation request processing, thereby preventing continuous expansion of the ARPS.

When the reusable AID is absent, in operation 1350, the value of the ARPS_End may be increased by "1" because all AID values corresponding to ARPS_Start through ARPS_End are allocated and the reusable AID is absent in the currently set ARPS. In operation 1360, to verify whether an expansion of the ARPS is available, whether the value of ARPS_End increased by "1" is identical to the value of the AROP_Start may be determined.

When the value of ARPS_End increased by "1" is identical to the value of the AROP_Start, since all available AIDs are allocated, an allocation of the AID may not be performed. Thus, a value of "−1" may be set to be ret_val in operation 1370.

When the value of ARPS_End increased by "1" differs from the value of the AROP_Start, the ARPS may be expanded by "1" and thus, the value of the ARPS_End increased by "1" may be set to be ret_val in operation 1380.

In operation 1340, the AP may return the set ret_val.

Figure 14:
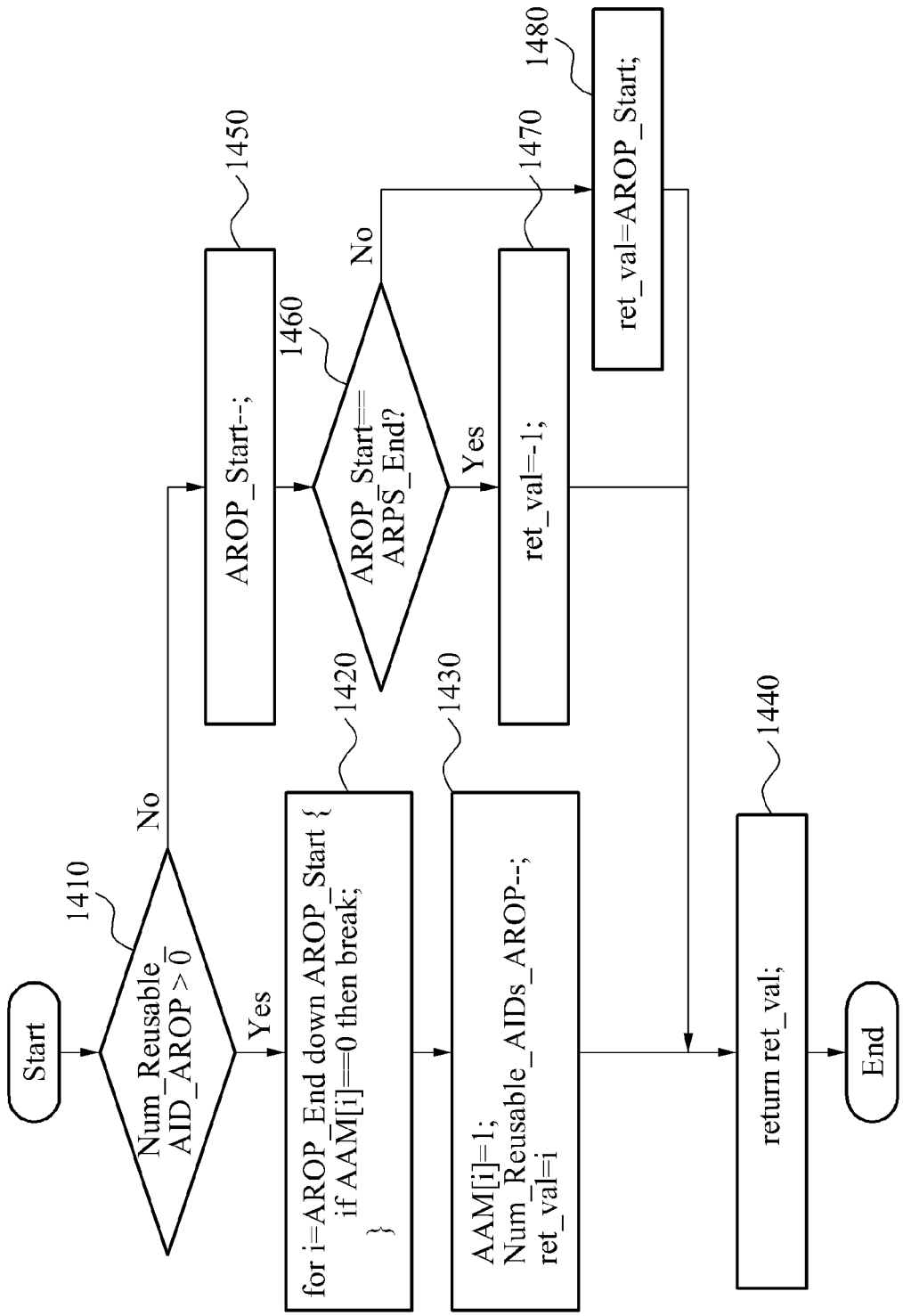
FIG. 14 is a flowchart illustrating a function of Alloc_AID_In_AROP( ) called to allocate an AID in an allocation region for other purposes according to an example embodiment.

FIG. 14 is a flowchart illustrating a function of Alloc_AID_In_AROP( ) called for allocating an AID in an allocation region for other purposes according to an example embodiment.

Referring to FIG. 14, in operation 1410, an AP according to an example embodiment may verify a number of reusable AIDs of ARPS based on a Num_Reusable_AIDs_AROP field value of the AMT.

When the reusable AID is present in operation 1420, the AP may search in a direction from AROP_End to AROP_Start for i corresponding to AAM[i]=0. The retrieved i may be set to be a return value, for example, ret_val. In operation 1430, since AID i is reused and allocated, an allocation of AID i may be indicated by setting AAM[i]=1, and the Num_Reusable_AIDs_ AROP field value may be reduced by "1" from a current value.

In an example of realizing Alloc_AID_In_AROP( ), when the reusable AID is retrieved, the searching is performed in the direction from AROP_End to ARPS_End to discover the reusable AID. Accordingly, the reusable AID close to ARPS_End of the AROP may be preferentially reused, and AROP_Start may be increased when conditions are satisfied in a dissociation request processing, thereby preventing continuous expansion of the AROP.

When the reusable AID is absent, in operation 1450, a value of the AROP_Start may be reduced by "1" because all AID values corresponding to AROP_Start through AROP_End are allocated and the reusable AID is absent in the AROP set currently. In operation 1460, to verify whether an expansion of the AROP is available, whether the value of the AROP_Start reduced by "1" is identical to a value of the ARPS_End may be determined.

When the value of the AROP_Start reduced by "1" is identical to the value of the ARPS_End, since all available AIDs are allocated, an allocation of the AID may not be performed. Thus, a value of "−1" may be set to be ret_val in operation 1470.

When the value of the AROP_Start reduced by "1" differs from the value of the ARPS_End, the AROP may be expanded by "1" and thus, the value of the AROP_Start reduced by "1" may be set to be ret_val in operation 1480.

In operation 1440, the AP may return the set ret_val.

Figure 15:
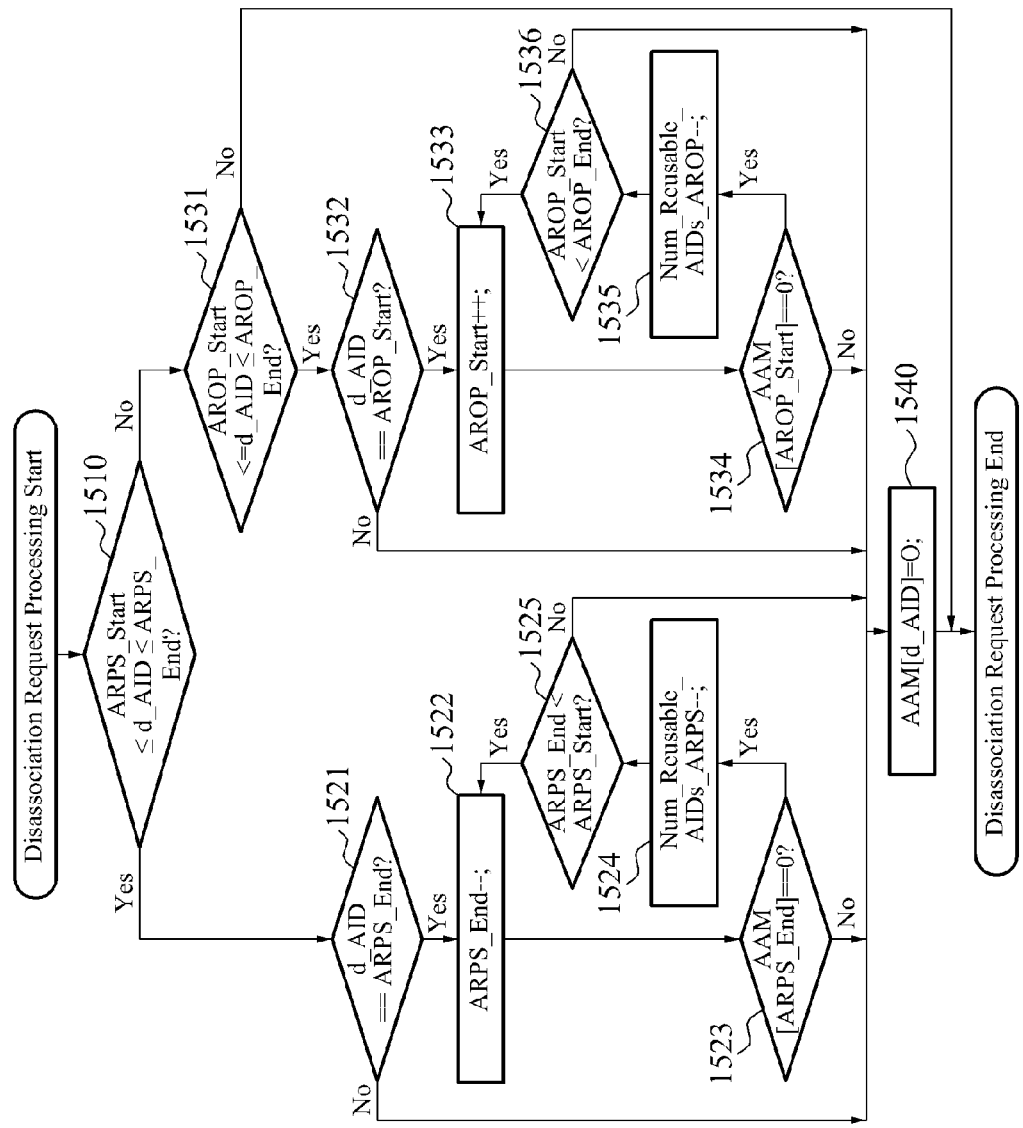
FIG. 15 is a flowchart illustrating a dissociation request processing according to an example embodiment.

FIG. 15 is a flowchart illustrating a dissociation request processing according to an example embodiment.

Referring to FIG. 15, a dissociation request frame processing unit of an AP according to an example embodiment may perform operations based on a region including an AID to be dissociated as described below. Hereinafter, the AID to be dissociated may be also referred to as d_AID.

In operation 1510, the AP may determine whether d_AID is included in an ARPS, for example, ARPS_Start d_AID ARPS_End.

When d_AID is included in an ARPS, for example, ARPS_Start d_AID ARPS_End, the AP may perform operations as described below.

In operation 1521, the AP may determine whether d_AID is identical to an end point of the ARPS, that is, ARPS_End. In operation 1522, the AP may reduce ARPS_End by "1". In operation 1523, the AP may determine whether a bit value of an AAM corresponding to ARPS_End reduced by "1" is "0". In operation 1524, when the bit value of the AAM corresponding to ARPS_End reduced by "1" is "0", the AP may reduce Num_Reusable_AIDs_ARPS by "1". In operation 1525, the AP may determine whether ARPS_End is less than ARPS_Start.

In operation 1540, the AP may set the bit value of the AAP corresponding to d_AID in the ARPS to be "0" so as to be reusable.

For example, when d_AID is identical to the end point of the ARPS, that is, ARPS_End, the AP may verify whether reduction of the ARPS is possible in order to perform the reduction. When a bit corresponding to ARPS_End is set to be "0", and when the bit value of the AAM corresponding to an AID less than "1" than a current ARPS_End value is "0", the AP may update the value of the ARPS_End with a value reduced by "1", and reduce Num_Reusable_AIDs_ARPS by "1". The aforementioned pattern may be repeated when the value of ARPS_End is greater than the value of the ARPS_Start. Accordingly, the AP according to an example embodiment may provide technology for reducing the ARPS in a direction to ARPS_Start.

When d_AID is included in an AROP, for example, AROP_Start<=d_AID AROP_End, the AP may perform operations as described below.

In operation 1531, the AP may determine whether d_AID is included in the AROP, for example, AROP_Start<=d_AID AROP_End. When d_AID is included in the AROP, in operation 1532, the AP may determine whether d_AID is identical to a start point of the AROP, that is, AROP_Start. In operation 1533, the AP may increase AROP_Start by "1". In operation 1534, the AP may determine whether a bit value of an AAM corresponding to AROP_Start increased by "1" is "0". In operation 1535, when the bit value of the AAM corresponding to AROP_Start increased by "1" is "0", the AP may reduce Num_Reusable_AIDs_AROP by "1". In operation 1536, the AP may determine whether AROP_Start is less than AROP_End.

In operation 1540, the AP may set the bit value of the AAP corresponding to d_AID in the AROP to be "0" so as to be reusable.

For example, when d_AID is identical to the start point of the AROP, that is, AROP_Start, the AP may verify whether reduction of the AROP is possible in order to perform the reduction. When a bit corresponding to AROP_Start is set to be "0", and when the bit value of the AAM corresponding to an AID greater than "1" than a current AROP_Start value is "0", the AP may update the value of the AROP_Start with a value increased by "1", and reduce Num_Reusable_AIDs_AROP by "1". In this instance, the AROP may be reduced. The aforementioned pattern may be repeated when the value of AROP_Start is greater than the value of the AROP_End. Accordingly, the AP according to an example embodiment may provide technology for reducing the AROP in a direction to AROP_End.

In other cases, for example, when d_AID is included in neither the ARPS nor the AROP, the AP according to an example embodiment may determine a state to be an exceptional state and terminate an operation without additional processing.

According to an embodiment of the present invention, it is possible to provide a technology for enabling an AP to manage an AAM and an AMT based on the aforementioned method, and to allocate and dissociate the AID so as to minimize a TIM IE.

In addition, according to an embodiment of the present invention, it is also possible to provide technology for enabling an AP to use a bitmap control field in a process of generating a TIM IE, and use an AAM and an AMT in a process of setting a PVM field, thereby ensuring a rapid setting According to example embodiments, there may be provided technology for enabling AIDs allocated to PSM STAs to be clustered rather than fragmented in a TIVM, using an AAM and an AMT for allocating the AIDs to the PSM STAs.

In example embodiments, in terms of generating a PVM included in the TIM IE, there may be provided technology for ensuring rapid verification of a PVM generation region in the TIVM using the AMT. According to example embodiments, there may be also provided technology for generating the PVM approximate to a possible minimum size.

For example, a beacon frame including the TIM IE in which the PVM is included may be transmitted for each beacon interval by an AP. Thus, when a size of the PVM is reduced, a size of the TIM IE may be reduced, thereby realizing an effect of minimizing a size of the beacon frame to be transmitted by the AP.

In example embodiments, the size of the PVM included in the beacon frame received for each beacon interval or each listen interval and analyzed by an STA may be minimized, thereby realizing an effect of rapid analysis of the beacon frame.

In example embodiments, requirements may comply with the relevant IEEE 802.11 standards, and the AAM and the AMT may be supportively used without expansion or modification of a procedure or a structure required in the IEEE 802.11 standards, thereby ensuring compatibility with existing WLAN devices.

When a third party uses technical concepts according to example embodiments without authentication, a protocol analysis may be performed in proper combination of an association, a reassociation, and a dissociation transmitted between one AP and at least three STAs, thereby demonstrating an unauthenticated use of the third party based on an AID allocation pattern on the PVM included in a beacon frame obtained through the protocol analysis.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic to unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The methods according to the above-described embodiments may be recorded, stored, or fixed in one or more non-transitory computer-readable media that includes program instructions to be implemented by a computer to cause a processor to execute or perform the program instructions. The media may also include, alone or in combination with the program instructions, data files, data structures, and the like. The program instructions recorded on the media may be those specially designed and constructed, or they may be of the kind well-known and available to those having skill in the computer software arts. Examples of non-transitory computer-readable media include magnetic media such as hard to disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An access point (AP) for providing wireless communication to a plurality of stations (STAs), the AP comprising:
   a type determiner configured to determine a type of each of the plurality of STAs based on whether each of the plurality of STAs operates based on a power saving mechanism (PSM);
   and an association identification (AID) allocator configured to:
   manage an AID allocation bitmap (AAM) and an AAM management table (AMT), where the AAM comprises a first region and a second region, bits in the AAM indicating whether an AID is allocated to a corresponding STA, the first region corresponding to first AIDs to be allocated to first-type STAs, the second region corresponding to second AIDs to be allocated to second-type STAs, and where the AMT comprising information associated with a start point of the first region, an end point of the first region, a start point of the second region, and an end point of the second region,
   allocate the first AIDs to the first-type STAs, from the start point of the first region in a first direction, the first AIDs corresponding to bits in the first region,
   allocate the second AIDs to the second-type STAs, from the end point of the second region in the opposite direction of the first direction, the second AIDs corresponding to bits in the second region, and
   generate a beacon frame including a traffic indication map (TIM) using the information of the AMT,
   where the TIM includes a partial virtual map (PVM) field being a subset of a traffic indication virtual bitmaps (TIVMs) bits in the PVM indicating whether traffic is buffered for a corresponding STA.

2. The AP of claim 1, wherein the AID allocator comprises: an allocation region dividing unit to divide an allocation region for allocating the AIDs to the plurality of STAs into a plurality of sub-allocation regions; and a sub-allocation region selecting unit to select a sub-allocation region corresponding to the determined type from among the plurality of sub-allocation regions to allocate the AIDs to the plurality of STAs based on the determined type.

3. The AP of claim 1, wherein the AID allocator comprises: an allocation region dividing unit to divide an allocation region for allocating the AIDs to the plurality of STAs into a plurality of sub-allocation regions, based on the AAM and the AMT.

4. The AP of claim 3, wherein the AMT further comprises information associated with reusable regions included in the plurality of sub-allocation regions.

5. The AP of claim 1, further comprising: a request receiver to receive, from each of the plurality of STAs, one of a plurality of predetermined requests comprising an association request, a reassociation request, and a dissociation request; and a request determiner to determine a type of the received request.

6. The AP of claim 5, wherein, when the request determiner determines the received request to be one of the association request and the reassociation request, the AID allocator allocates the AIDs to the plurality of STAs by using a reusable region of a cluster corresponding to the determined type.

7. The AP of claim 5, further comprising: an AID dissociating unit to dissociate the AIDs from the plurality of the STAs when the request determiner determines the received request to be the dissociation request, wherein the AID dissociating unit determines, based on a result of the dissociating, whether reducing a size of the cluster corresponding to the determined type is possible, and reduces, based on a result of the determining, the size of the cluster corresponding to the determined type.

8. The AP of claim 1, wherein the TIM further includes a bitmap offset field,
   wherein if the at least one frame is transmitted to one or more station in the first-type stations, the bitmap offset field is set to a value related to the smallest AID value among the AIDs of the first-type stations and
   wherein if the at least one frame is transmitted to one or more station in the second-type stations, the bitmap offset field is set to a value related to the largest AID value among the AIDs of the second-type stations.

9. An operation method of an access point (AP) providing wireless communication to a plurality of stations (STAs) supporting a power saving mechanism (PSM), the method comprising:
   determining a type of each of the plurality of STAs based on whether each of the plurality of STAs operates based on a power saving mechanism (PSM);
   managing an AID allocation bitmap (AAM) and an AAM management table (AMT), where the AAM comprises a first region and a second region, bits in the AAM indicating whether an AID is allocated to a corresponding STA, the first region corresponding to first AIDs to be allocated to first-type STAs, the second region corresponding to second AIDs to be allocated to second-type STAs, and where the AMT comprising information associated with a start point of the first region, an end point of the first region, a start point of the second region, and an end point of the second region, allocating the first AIDs to the first-type STAs, from the start point of the first region in a first direction, the first AIDs corresponding to bits in the first region, allocating the second AIDs to the second-type STAs, from the end point of the second region in the opposite direction of the first direction, the second AIDs corresponding to bits in the second region, and generating a beacon frame including a traffic indication map (TIM) using the information of the AMT, where the TIM includes a partial virtual map (PVM) field being a subset of a traffic indication virtual bitmaps (TIVMs) bits in the PVM indicating whether traffic is buffered for a corresponding STA.

10. The method of claim 9, further comprising:

receiving an association request signal from a station among the plurality of STAs; and determining, based on the association request signal, whether each of the plurality of STAs is in a power save (PS) mode, wherein the determining comprises allocating the AIDs to the plurality of STAs based on a result of the determining.

11. The method of claim 9, further comprising: receiving a dissociation request signal from each of the plurality of STAs; and dissociating the AIDs from the plurality of STAs such that the size of the beacon frame is reduced.

12. The method of claim 9, further comprising:

receiving an association request signal from each of the plurality of STAs;

allocating association identifications (AIDs) to the plurality of STAs such that a size of a beacon frame periodically transmitted to the STA is reduced; and transmitting an association response frame including the allocated AIDs to the plurality of STAs.

* * * * *